United States Patent
Michels

(10) Patent No.: US 11,416,481 B2
(45) Date of Patent: Aug. 16, 2022

(54) SEARCH QUERY GENERATION USING BRANCHING PROCESS FOR DATABASE QUERIES

(71) Applicant: SAP SE, Walldorf (DE)

(72) Inventor: Frank Michels, Speyer (DE)

(73) Assignee: SAP SE, Walldorf (DE)

( * ) Notice: Subject to any disclaimer, the term of this patent is extended or adjusted under 35 U.S.C. 154(b) by 496 days.

(21) Appl. No.: 15/969,631

(22) Filed: May 2, 2018

(65) Prior Publication Data
US 2019/0340279 A1    Nov. 7, 2019

(51) Int. Cl.
G06F 16/2453    (2019.01)
G06F 16/242    (2019.01)

(52) U.S. Cl.
CPC ........ *G06F 16/2453* (2019.01); *G06F 16/243* (2019.01)

(58) Field of Classification Search
CPC ............. G06F 16/243; G06F 16/24522; G06F 16/2453
See application file for complete search history.

(56) References Cited

U.S. PATENT DOCUMENTS

| | | | |
|---|---|---|---|
| 6,363,373 B1 * | 3/2002 | Steinkraus | G06F 16/313 |
| 6,741,959 B1 * | 5/2004 | Kaiser | G06F 16/3347 |
| | | | 704/7 |
| 7,720,674 B2 * | 5/2010 | Kaiser | G06F 16/24522 |
| | | | 704/9 |
| 8,935,277 B2 * | 1/2015 | Kuchmann-Beauger | G06F 16/24535 |
| | | | 707/769 |
| 9,448,995 B2 * | 9/2016 | Kurz | G06F 40/284 |
| 9,589,060 B1 * | 3/2017 | MacGillivray | G06F 16/9024 |
| 10,200,397 B2 * | 2/2019 | Dhar | G06Q 50/265 |
| 10,540,378 B1 * | 1/2020 | Hsiao | G06K 9/78 |
| 10,810,374 B2 * | 10/2020 | Zhai | G06F 40/284 |
| 2002/0091685 A1 * | 7/2002 | Feldman | G06F 16/24568 |
| 2004/0167875 A1 * | 8/2004 | Sneiders | G06F 16/24522 |
| 2005/0197828 A1 * | 9/2005 | McConnell | G06F 40/169 |
| | | | 704/9 |
| 2005/0289100 A1 * | 12/2005 | Dettinger | G06F 16/2425 |
| 2006/0111893 A1 * | 5/2006 | Florian | G06F 40/58 |
| | | | 704/8 |
| 2006/0155688 A1 * | 7/2006 | Chou | G06F 16/951 |
| 2006/0206472 A1 * | 9/2006 | Masuichi | G06F 16/3329 |

(Continued)

OTHER PUBLICATIONS

Mulang et al. "Matching Natural Language Relations to Knowledge Graph Properties for estion Answering" 2017 ACM (Year: 2017).*

*Primary Examiner* — Mark D Featherstone
*Assistant Examiner* — Navneet Gmahl
(74) *Attorney, Agent, or Firm* — Fountainhead Law Group P.C.

(57) ABSTRACT

In one embodiment, a method receives a search query including terms formed in a natural language expression. The terms are included in entities that are categorized in types of entities. The method analyzes the entities for the terms to generate a set of branch queries that include different combinations of entities for the terms. The set of branch queries are ranked based on the types of entities associated with entities of the respective branch queries and a branch query is selected based on the ranking for the branch query. The method uses the entities of the branch query to perform a search of a structured database of structured objects.

18 Claims, 15 Drawing Sheets

(56) References Cited

U.S. PATENT DOCUMENTS

| | | | |
|---|---|---|---|
| 2007/0015119 A1* | 1/2007 | Atenasio | G09B 29/106 434/130 |
| 2008/0288480 A1* | 11/2008 | Yahia | G06Q 30/02 |
| 2009/0144262 A1* | 6/2009 | White | G06F 16/242 |
| 2010/0306214 A1* | 12/2010 | Paparizos | G06F 16/951 707/759 |
| 2011/0087670 A1* | 4/2011 | Jorstad | G06F 40/284 707/741 |
| 2012/0084291 A1* | 4/2012 | Chung | G06F 16/14 707/741 |
| 2012/0136649 A1* | 5/2012 | Freising | G06F 40/30 704/9 |
| 2012/0179710 A1* | 7/2012 | Hanai | G06F 16/24522 707/769 |
| 2013/0031113 A1* | 1/2013 | Feng | G06F 16/9537 707/755 |
| 2013/0054589 A1* | 2/2013 | Cheslow | G06F 16/3344 707/728 |
| 2013/0086067 A1* | 4/2013 | Khoussainova | G06F 16/3322 707/737 |
| 2013/0166573 A1* | 6/2013 | Vaitheeswaran | G06F 16/242 707/749 |
| 2013/0218899 A1* | 8/2013 | Raghavan | G06F 16/156 707/741 |
| 2013/0226846 A1* | 8/2013 | Li | G06F 40/295 706/12 |
| 2014/0236579 A1* | 8/2014 | Kurz | G06F 16/3344 704/9 |
| 2016/0285816 A1* | 9/2016 | Schmid | H04L 67/306 |
| 2016/0378764 A1* | 12/2016 | Michels | G06F 16/24575 707/723 |
| 2017/0024443 A1* | 1/2017 | Dayan | G06F 16/3338 |
| 2017/0075953 A1* | 3/2017 | Bozkaya | G06F 16/24522 |
| 2017/0116260 A1* | 4/2017 | Chattopadhyay | G06F 16/243 |
| 2017/0147580 A1* | 5/2017 | Buchmann | G06F 16/24578 |
| 2017/0228372 A1* | 8/2017 | Moreno | G06F 16/3329 |
| 2018/0039692 A1* | 2/2018 | Wang | G06F 16/2448 |
| 2018/0052842 A1* | 2/2018 | Hewavitharana | G06F 40/58 |
| 2018/0089316 A1* | 3/2018 | Ganot | G06F 16/3344 |
| 2019/0179962 A1* | 6/2019 | Khan | G06N 20/00 |
| 2019/0347077 A1* | 11/2019 | Huebra | G06F 16/22 |
| 2019/0347298 A1* | 11/2019 | Kumar | G06F 16/90332 |
| 2019/0392066 A1* | 12/2019 | Kim | G06F 40/35 |

\* cited by examiner 1. processTerm(*offset*, *currentBranch*)

2. var currentTerm = term at *offset* in AnalyzedTerms[]

3. sort currentTerm.Entities[] by weight descending 4. for each entity in currentTerm.Entities[] starting at offset 5. If currentBranch is empty 6. new branch 7. add branch into branchList 8. Else 9. If end of currentBranch < offset 10. branch = currentBranch 11. reserveBranch = clone of currentBranch 12. Else       -> branch 13. branch = clone of reserveBranch 14. add branch to branchList 15. add entity to branch 16. endOffset = end offset of branch 17. find first term in AnalyzedTerms[] with offset > endOffset -> nextTerm 18. Else: Call processTerm(*offset* = offset of nextTerm, *currentBranch* = branch )

| Sales | orders | delivery | date | after | May |
|---|---|---|---|---|---|
| Business Object | | | | | |
| Term | Term | | | | |
| | | Condition (with Attribute "delivery date", Operator "after": ">=", Value "May": 2018-05) | | | |
| | | Term | Term | Term | Term |

902 — top row
904 — bracketed rows below

| Fiscal | year | 2014 |
|---|---|---|
| Condition(Attribute:"Fiscal year" Operator: "=" Value: "2014") | | |
| Term | Term | Term |

1002 — top row
1004 — bracketed rows below

| Business | Partner | Company Name #1 |
|---|---|---|
| Business Object | | Term |
| Term | Term | |

1102 — top row
1104 — bracketed rows below

FIG. 11

SEARCH QUERY GENERATION USING BRANCHING PROCESS FOR DATABASE QUERIES

BACKGROUND

A search engine that allows a user to search using natural language expressions is convenient for a user. For example, a user can input a natural language expression without knowing any of the structure of the data, and the search engine can return search results for the search query. Typically, the search engine searches data that has been previously indexed. For example, a company may index the employee names. Then, the search engine uses the natural language query to retrieve search results based on the search query matching some terms of the index, such as the employee name.

When a structured database is used, the natural language expression may not directly map to searching structured objects in the structured database. For example, the structured objects may be organized in tables that are connected via keys. The data in the tables is stored in columns. The structured database includes metadata that describes the structured objects, such labels identify business objects or attributes of the business objects. The natural language results may not be optimal when searching the structured database. For example, a natural language expression may not return any results at all (or results that are not what the user wanted) because the metadata for the structured objects is not indexed. For example, a search of "employee Shelly" may not return any results because "employee" is metadata and not indexed. Also, a natural language query of "201805*" might retrieve results from the "delivery date" attribute, but could also retrieve results from the "created on" attribute of the "sales order" object. But, the natural language query could even retrieve results from different objects, if the objects are not restricted in the query. A regular structured query on "sales orders" could be: DELIVERY_DATE='201805*', but this would need a special advanced-search user interface to add that condition, such as a drop down menu that specifies the objects and conditions that can be used. The structured query could not be input into the search input field using natural language expressions. Further, if the natural language expression is used to search through all objects, then the search may unnecessarily use computing resources. For example, the search may increase the system load by having to search all the objects in the structured database.

BRIEF DESCRIPTION OF THE DRAWINGS

FIG. 8 depicts an example of pseudocode according to some embodiments.

FIG. 9 depicts a first example of selecting a branch query according to some embodiments.

FIG. 10 depicts a second example of selecting a branch query according to some embodiments.

FIG. 11 depicts a third example of selecting a branch query according to some embodiments.

DETAILED DESCRIPTION

Figure 1:
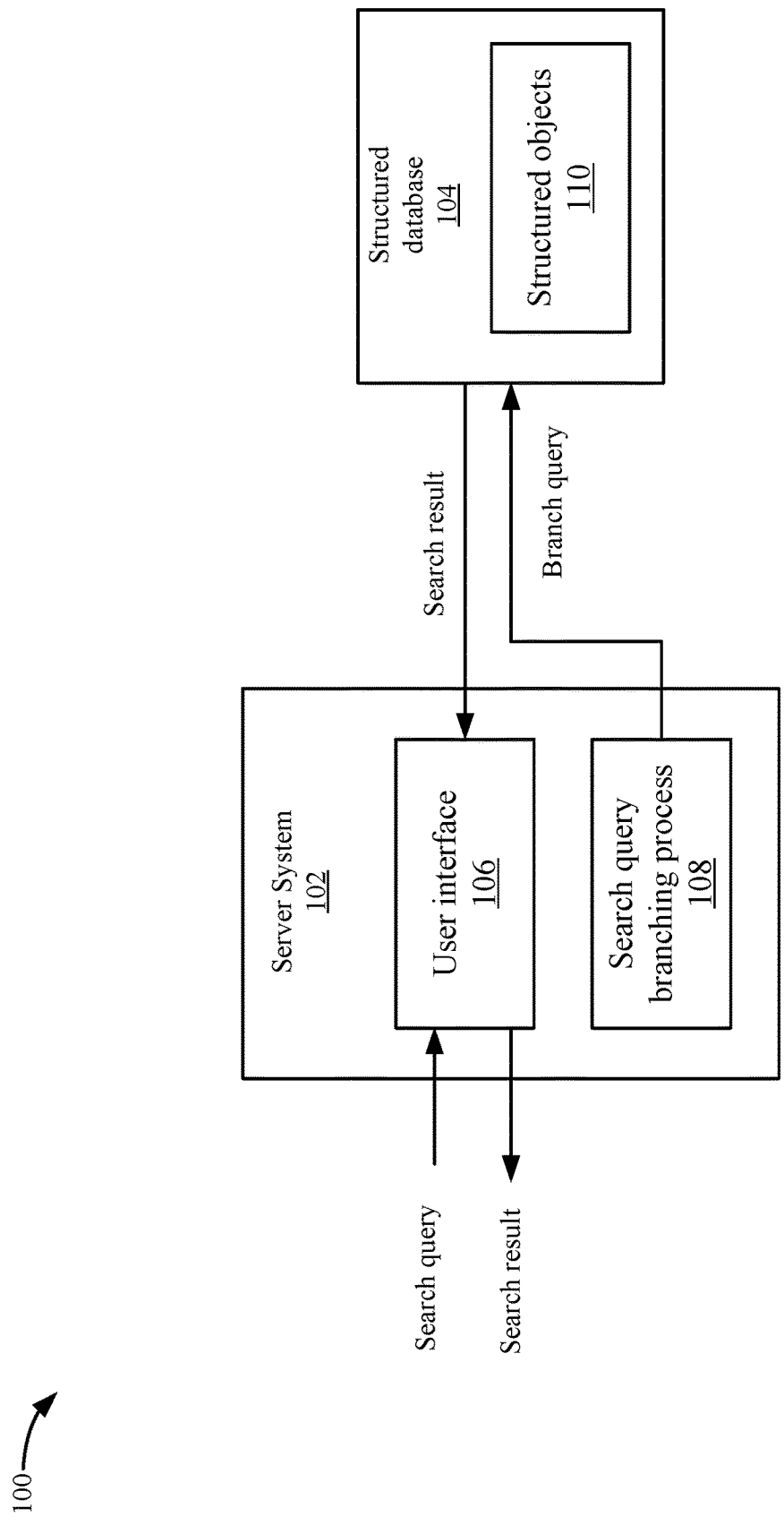
FIG. 1 depicts a simplified system of a method for performing branch queries of a structured database according to some embodiments.

Described herein are techniques for a search system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A system receives a search query that includes a number of terms, such as a natural language expression of terms. The search query searches a structured database that stores structured objects, such as business objects. A business object may be an object within the structured database that is defined by metadata. For example, an object may have a label of "employees" that includes attributes of "name", "age", "position", etc. The employee business object may include multiple tables for each of the attributes that are linked together. Also, each table may include labels that identify the attributes.

The system attempts to create a technical query that is based upon the natural language expression. The technical query is designed to query the structured database more efficiently by defining a scope of the search based on the metadata of the structured objects to reduce the data searched and also defining the conditions to apply to the search of the data. The system can first analyze the terms of the search query by applying rules and text dictionaries to categorize the terms into types of entities based upon metadata for the structured objects. A type of entity may categorize a term in regards to metadata of the structured database. For example, types of entities include a business object entity, a condition entity, and a search term entity.

The system analyzes the terms and the types of entities associated with the terms to generate a set of branch queries. For example, different combinations of the entities may form different branch queries. In some examples, the search query of "sales orders with a delivery date after May" may search a business object of "sales orders" with a condition of "delivery date>=2018-05". The system has translated the natural language expression into a query of a business object label (e.g., sales orders) with a condition (e.g., delivery date>=2018-05). The branch query is different from a natural language search that searches each term in the search query individually, such as a search query of "sales", "orders", "with", "delivery", "date", "after", and "May".

The branch queries include different combinations of the types of entities and terms. For example, it is possible that the query "fiscal year 2014" may be associated with the business object of "business partners" and the condition "fiscal year"="2014" and also the business object of "customers" and the condition "fiscal year"="2014". The system may determine which of these branch queries should be performed based on an analysis of the types of entities in the branch queries. For example, the system may rank each branch query and then select at least one of the branch queries. In some embodiments, the system generates a score for each branch query and then selects a branch query with the highest score. Then, the system uses the branch query to perform a search of the structured database of structured objects. In contrast to the system discussed in the Background, which may have performed a natural language search for all the terms in the database, the system may select the branch query that is highest rated and perform the branch query on portions of the database associated with entities of the branch query. Using the branch query instead of searching all the data may use less computing resources and reduce the load on the structured database. The use of the highest ranked branch query also improves the performance of processing queries for the structured database because load is reduced especially when the structured database is processing multiple search queries. Additionally, the search results returned by the system may be more accurate because the search results are focused on the entities that are configured based on the metadata of the structured database and also the branch query that is the most highly rated may be used. This may avoid the situation described in the Background where the natural language query returned results that were not desired from multiple business objects. The highest ranked branch query may be similar to when a user used a specialize user interface to select business objects and conditions, such as via drop down menus.

System

FIG. 1 depicts a simplified system 100 of a method for performing branch queries of a structured database according to some embodiments. A server system 102 can receive a search query from a user and provide search results from a structured database 104. In some embodiments, server system 102 includes one or more computing devices to process the search query and generate search results. It should be understood that functions described may be distributed to different computing devices or performed by the same computing device. For example, search system 102 may communicate with a database server to perform a database query for the search.

Structured database 104 may include structured objects 110 that are organized based on a structure defined by metadata. In some embodiments, the structured objects include business objects that organize data in a business objects structure. For example, a business object may include a set of attributes with different data types, such a business object may be "employees" and stores data for the employees of a company. Each business object may have a label for each attribute, such as an attribute of "first name" of an employee has a label of "first name". A table may store data for the attributes and may include one or more columns to store data for the attributes, such as a table for the attribute of "first name" stores the first names of all employees of the company in a column. Different attributes may be stored in multiple tables that may be connected via keys. For example, another table for the last name of the employee has a label of "last name", and is linked to the table for the first name of the employee. The connected tables may form the business object.

A user interface 106 may include an entry area that allows a user to enter a search query for structured database 104. User interface 106 may receive a natural language expression for the search query. The natural language expression may include a set of terms that may be input by a user. For example, the set of terms may be a search for "sales orders with a delivery date after May". In some embodiments, user interface 104 does not identify the metadata of structured database 104, such as user interface 106 does not have a drop down menu to select the business object to search. The natural language expression is different from a structured search query that may specify the structure that defines the business object, such as by the labels for the business object or the attributes of the tables in structured database 104.

A search query branching process 108 receives entities for the terms. An analysis system (not shown) can first analyze the terms of the search query by applying rules and text dictionaries to categorize the terms based upon metadata for the structured objects. For example, the analysis system searches for terms and phrases known from textual labels in the metadata, e.g. "Customers"—a label for a business object, or "City" a label for an attribute. Furthermore, the analysis system searches pre-defined patterns such as "in city London" to identify conditions in the natural language expression.

Search query branching process 108 then analyzes the terms of the search query and associated types of entities for the terms to generate branch queries. Search query branching process 108 generates the branch queries by analyzing different combinations of entities associated with the terms. For example, each term may be associated with one or more entities. Search query branching process 108 may generate multiple branch queries from different combinations of the entities for the terms. Search query branching process 108 then ranks the branch queries and may select a branch query that is rated the highest.

Upon selecting the branch query, search query branching process 108 searches structured database 104 using the selected branch query. The branch query may return a search result from structured objects 110. For example, the branch query may search a business object with a condition, such as a business object "sales orders" with a condition of "delivery date">="2018-05". Other business objects, such as the "employee" business object are not searched because this business object is not identified in the branch query.

The branch query uses the metadata of structured objects 110 to perform a more focused search. For example, instead of searching all objects in structured objects 110, the branch query searches the business object of "sales orders". Additionally, instead of searching for the term "May" in all entries in structured objects 110, the branch query searches for the condition of a delivery date>=the date 2018-05 in the business object of "sales orders". The branch query thus is a more focused search than searching structured objects 110 with the natural language expression, which uses less computing resources and may provide better search results.

Search Process

Figure 2:
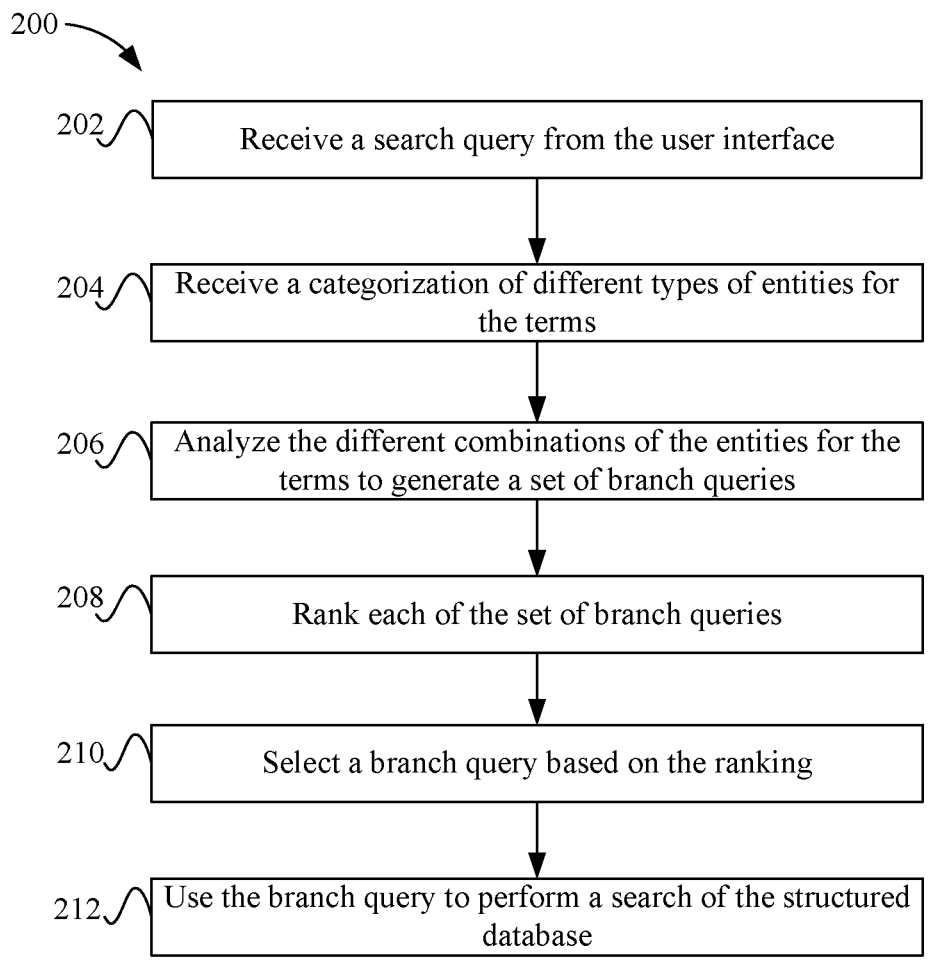
FIG. 2 depicts a simplified flowchart of a method for performing a branch query according to some embodiments.

FIG. 2 depicts a simplified flowchart 200 of a method for performing a branch query according to some embodiments. At 202, search query branching process 108 receives a search query from user interface 106. For example, the search query may be "consumer products in green color blue". The terms in the search query are the individual words of "consumer", "products", "green", "color", and "blue".

At 204, search query branching process 108 receives a categorization of different types of entities for the terms. A textual analysis may be performed to determine the different types of entities for the terms. For example, the textual analysis may be performed by applying rules in text dictionaries to the terms that are based on the metadata from the structured database 104. For example, the entity search may search for terms and phrases known from textual labels in the metadata, such as "customers", which is a label for a business object or "city", which is a label for an attribute of the business object. Further, the term search may search pre-defined patterns, such as "in city London" to identify a condition, which may be "city=London". One type of entity is a business object that defines a scope of the search, such as a business object of "customers" or "sales orders". Another type of entity is a condition, which is a condition against an attribute, such as "city Amsterdam" is "city EQ 'Amsterdam'". A condition may include an attribute, operator, and value. The attribute is a term that identifies the attribute, such as a city and is part of the condition. An operator is when a term identifies an operator, such as "after" identifies a condition of ">=". A value is when a term matches the value of an attribute, such as Amsterdam. Another entity may be search terms, which are terms that cannot be identified as any of the above entities. These terms are not associated with metadata in structured database 104. Search query branching process 108 may apply the terms in a conventional natural language search.

The following are some examples of search queries received in a natural language expression and the entities identified by the text analysis. Each term can be matched by one or more multiple alternative entities and entities can span one or more terms. That is, multiple words may form a single entity, such as "sales" and "orders" forms a business object of "sales orders". Below, a first search query is "sales orders with delivery date after May", a second search query is "fiscal year 2014", and a third search query is "consumer products in green color blue". The text analysis may determine the following entities for the terms of the search query:

1. "Sales orders with delivery date after May"
Business Object (BO): "Sales orders"
Condition: ("delivery date">="2018-05")
Term: "Sales"
Term: "orders"
Term: "delivery"
Term: "date"
Term: "after"
Term: "May"
2. "Fiscal year 2014"
BO: "Business Partners" (because "Fiscal year" is an attribute of this BO)
BO: "Customers" (because "Fiscal year" is also an attribute of this BO)
Condition: ("Fiscal year"="2014")
Term: "Fiscal"
Term: "year"
Term: "2014"
3. "Consumer products in green color blue"
BO: "Consumer products"
Condition: ("color"="green")
Condition: ("color"="blue")
Term: "Consumer"
Term: "product"
Term: "green"
Term: "color"
Term: "blue"

As seen above, some terms may be associated with multiple entities, such as fiscal year may be an attribute of a first business object of "Business Partners" and a second business object of "Customers". Also, multiple terms of "fiscal" and "year" are associated with a single business object; that is, the business object spans multiple terms of "fiscal year". Some terms in the search query may not be associated with a search term and ignored, such as conjunctive words "with", and "in". Also, each single term is associated with a search term that is used to perform a natural language query.

Figure 3A:
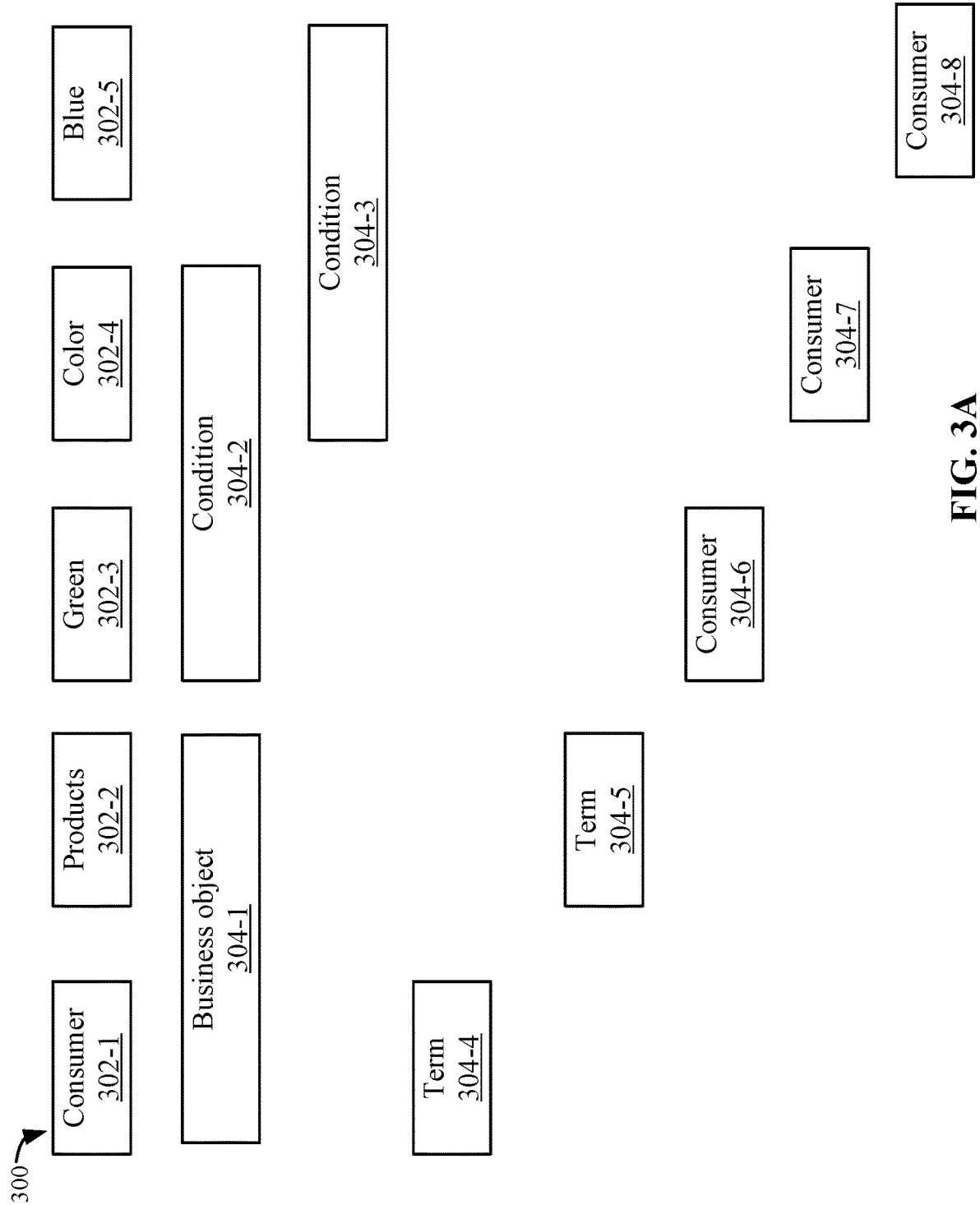
FIG. 3A depicts an example of putting the entities next to associated terms according to some embodiments.

At 206, search query branching process 108 analyzes the different combinations of entities for the terms to generate a set of branch queries. In some embodiments, search query branching process 108 may use the sequence of terms of the search query and an unordered list of entities to generate the set of branch queries. FIG. 3A depicts an example of putting the entities next to associated terms according to some embodiments. Each entity may have an offset and a span of terms and search query branching process 108 may put an entity next to the terms with the same offset. The offset of the entity may indicate the position in the sequence of terms. For example, the search query of terms is shown as consumer 302-1, products 302-2, green 302-3, color 302-4, and blue 302-5 for search query of "consumer products green color blue". The offsets may be based on the number of letters for the terms consumer 302-1, products 302-2, green 302-3, color 302-4, and blue 302-5, respectively. So, an offset of "1" will place an entity at the term of consumer 302-1 as shown by the entity business object 304-1. An offset of "10" may place the entity at the term products 302-2 because the term "consumers" is nine characters long. The other offsets may be determined similarly. The span indicates how many terms the entity covers, such as an entity of business object 304-1 has a span of 2 terms and spans the terms consumer 302-1 and products 302-2.

Each type of the entity includes content based on the associated terms. For example, business object 304-1 includes the terms "consumer products", condition 304-2 includes the terms "color" and "green" with a condition as defined by "COLOR EQ green", and condition 304-3 includes the terms "color" and "blue" with a condition as defined by "COLOR EQ blue". Then, terms 304-4 to 304-8 correspond to the individual terms of "consumer", "product", "green", "color", and "blue", respectively.

There is no connection between any of the entities at this point. Search query branching process 108 then analyzes the entities to generate branches of the entities matching each term. A branch may be a chain of entities. Some of the entities are adjacent and some are overlapping. In some embodiments, search query branching process 108 connects any adjacent entities to the other into a chain for a branch. Any overlapping entities cause branching (e.g., two entities that start at the same offset), which means a new alternative interpretation is generated as a branch.

To illustrate the branches, FIGS. 3B to 3F show examples of generating branch queries according to some embodiments. Search query branching process 108 may walk the terms of the search query in a direction, for example, from left to right, to determine the branches. Although the following example is used, other methods to generate the branches may also be used.

Figure 3B:
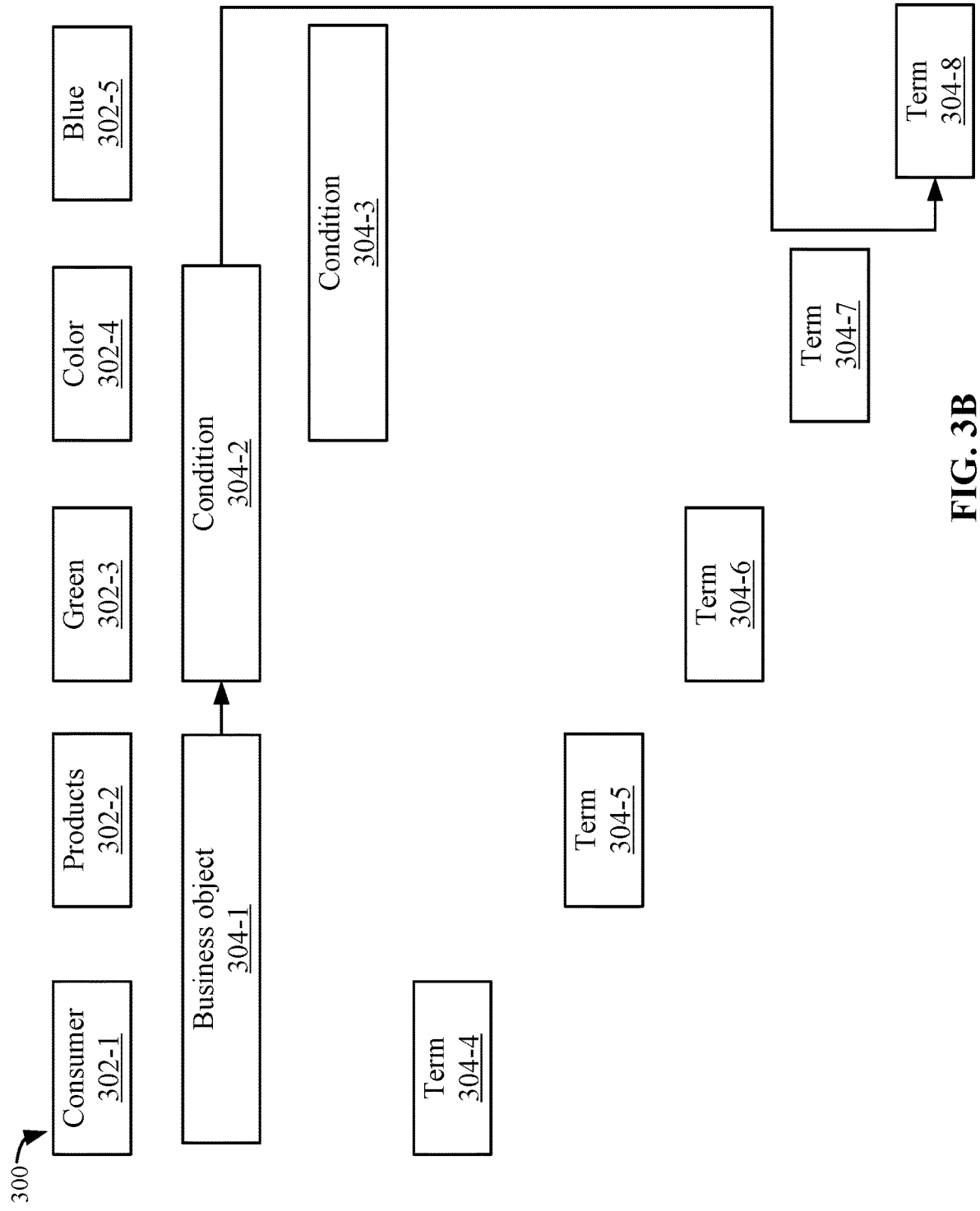
FIGS. 3B to 3F show examples of generating branch queries according to some embodiments.
Figure 3C:
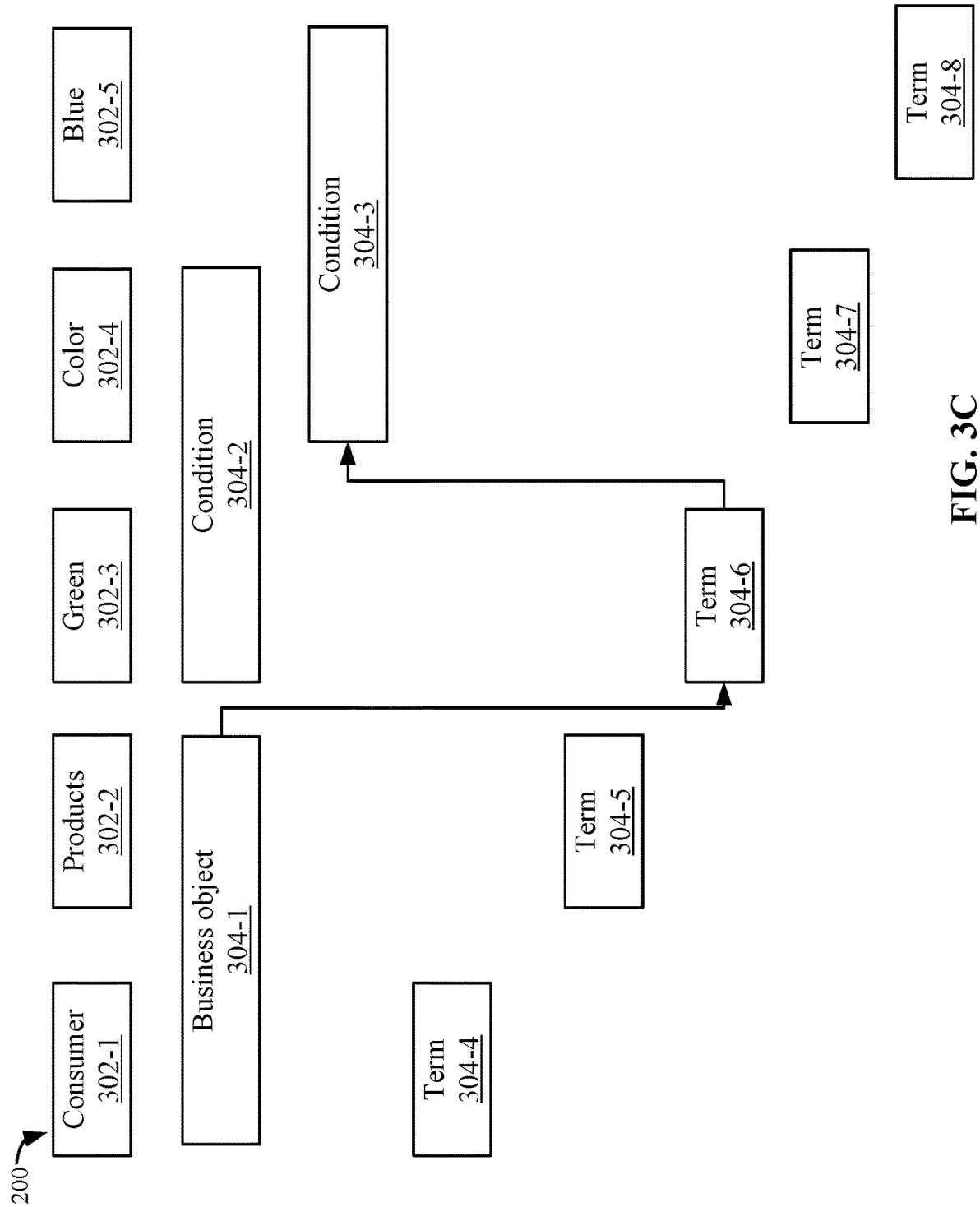

FIG. 3B depicts an example of a first branch according to some embodiments. Search query branching process 108 starts with business object 304-1 of "consumer products, which spans two terms. Then, starting from the offset of the position of the third term, search query branching process 108 determines any entities that are associated with the third term of green 302-3, of which there are two choices of condition 304-2 and term 304-6. This creates a branch at this point because there are two paths that can be taken after business object 304-1. FIG. 3B depicts one of the branches and FIG. 3C depicts the other branch. In FIG. 3B, the search query branching process 108 selects condition 304-2 as the next entity. Condition 304-2 spans the terms of "green" and "color". Since condition 304-2 spans two terms, the next entity is associated with "blue" 302-5. In this example, search query branching process 108 selects term 304-8.

FIG. 3C depicts a second branch query according to some embodiments. Starting with business object 304-1, search query branching process 108 selects term 304-6 as the next entity associated with the term green 302-3. Then, after term 304-6, search query branching process 108 can select from condition 304-3 and term 304-4 for the term color 302-4, which creates another branch. FIG. 3C depicts an example when search query branching process 108 selects condition 304-3 as the next entity. In FIG. 3C, condition 304-3 spans the terms "color" and "blue" and the process ends. Additionally, search query branching process 108 could select terms 304-7 and 304-8 as another branch. However, since there is a better option of a condition 304-3 for these terms, the individual terms are skipped in creating a new branch, but another branch could be created.

Figure 3D:
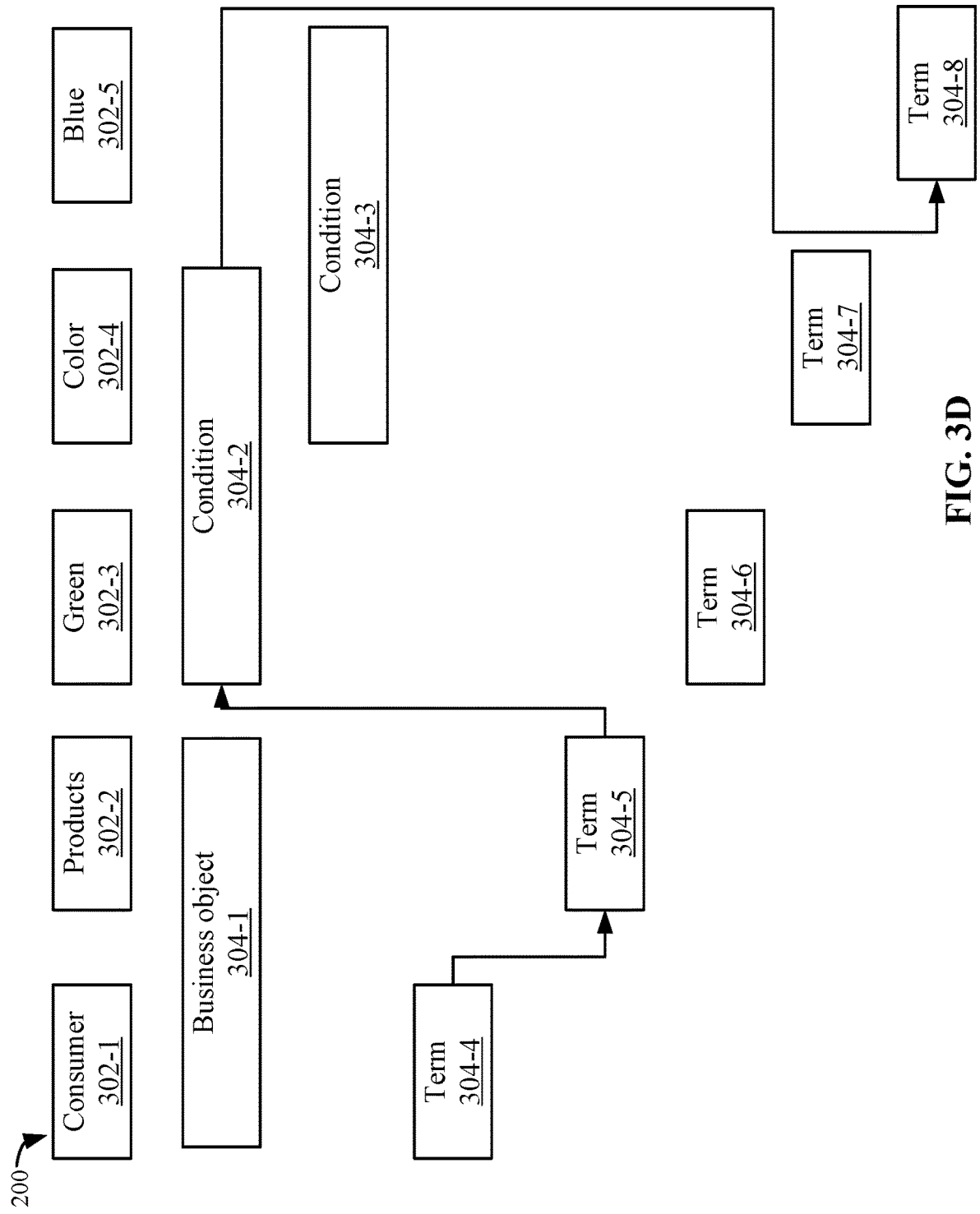
Figure 3E:
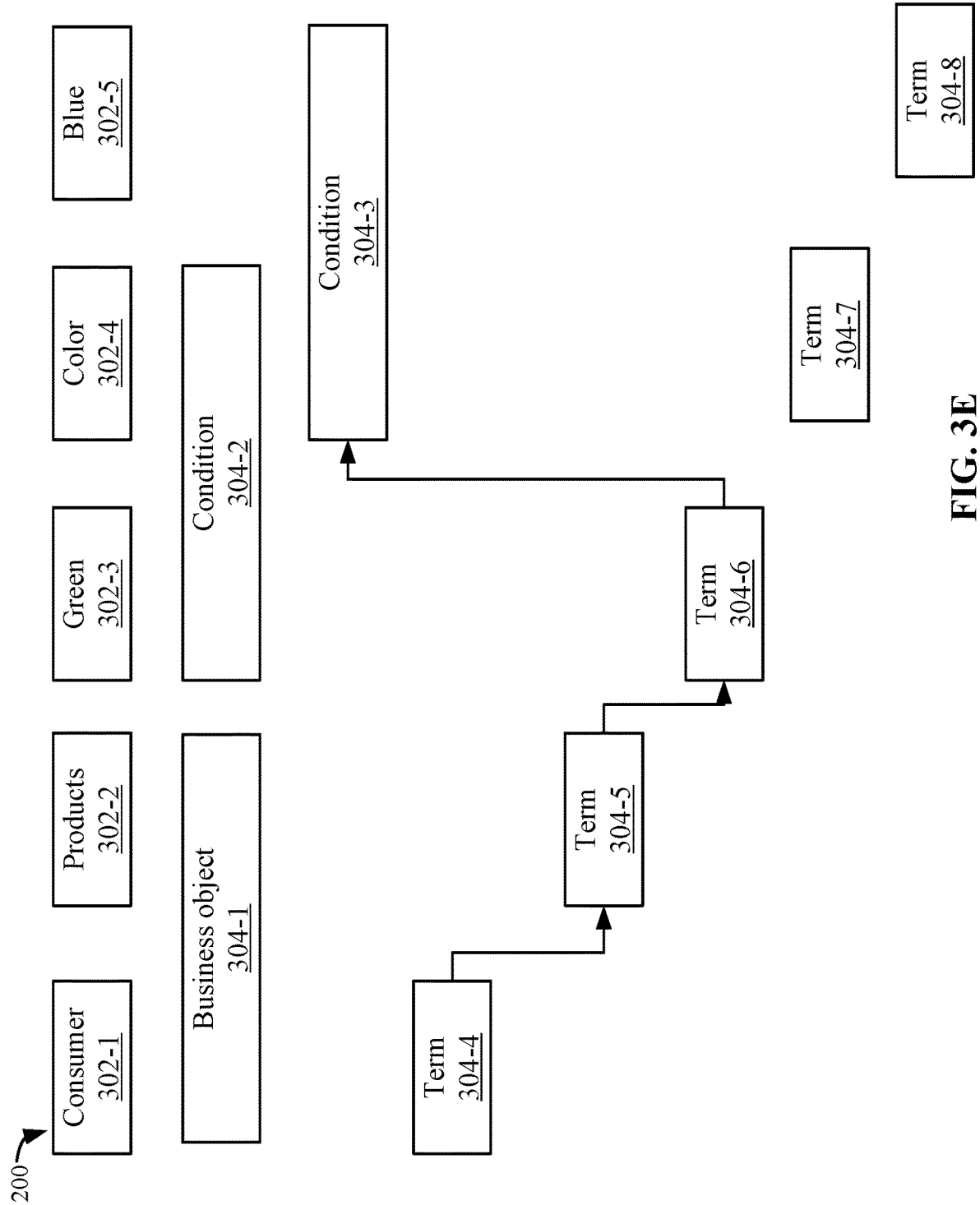
Figure 3F:
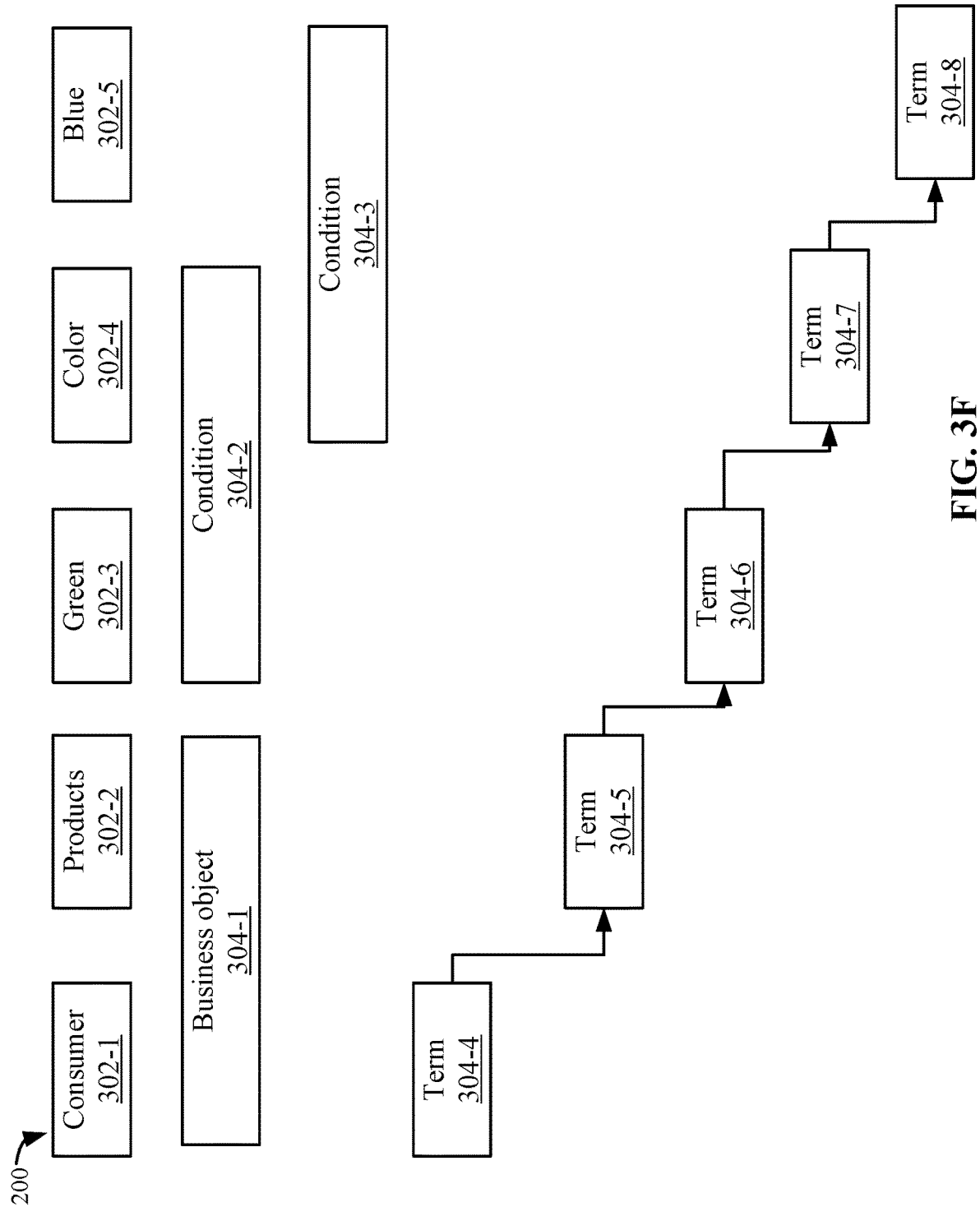

After analyzing the branches starting with business object 304, search query branching process 108 starts with the second entity associated with consumer 302-1. FIGS. 3D to 3F show examples of branch queries starting with the term 304-4 according to some embodiments. FIG. 3D depicts an example of a third branch query according to some embodiments. After term 304-4, search query branching process 108 selects term 304-5 for products 302-2. Term 304-5 is the only entity that starts with products 302-2. Then, green 302-3 is associated with condition 304-2 and term 304-6. This results in a branch. In FIG. 3D, search query branching process 108 selects condition 302-2, which spans the terms green 302-3 and color 302-4. After condition 304-2, search query branching process 108 selects term 304-8.

FIG. 3E depicts an example of a fourth branch query according to some embodiments. Search query branching process 108 selects term 304-4, term 304-5, and term 304-6. Then, search query branching process 108 can select either condition 304-3 or term 304-7. In this branch, search query branching process 108 selects condition 304-3. Condition 304-3 spans color 302-4 and blue 302-5 and thus the branch ends.

FIG. 3F depicts an example of a fifth branch query according to some embodiments. In this example, search query branching process 108 selects terms 304-4 to 304-8, which matches the original natural language query.

Figure 4:
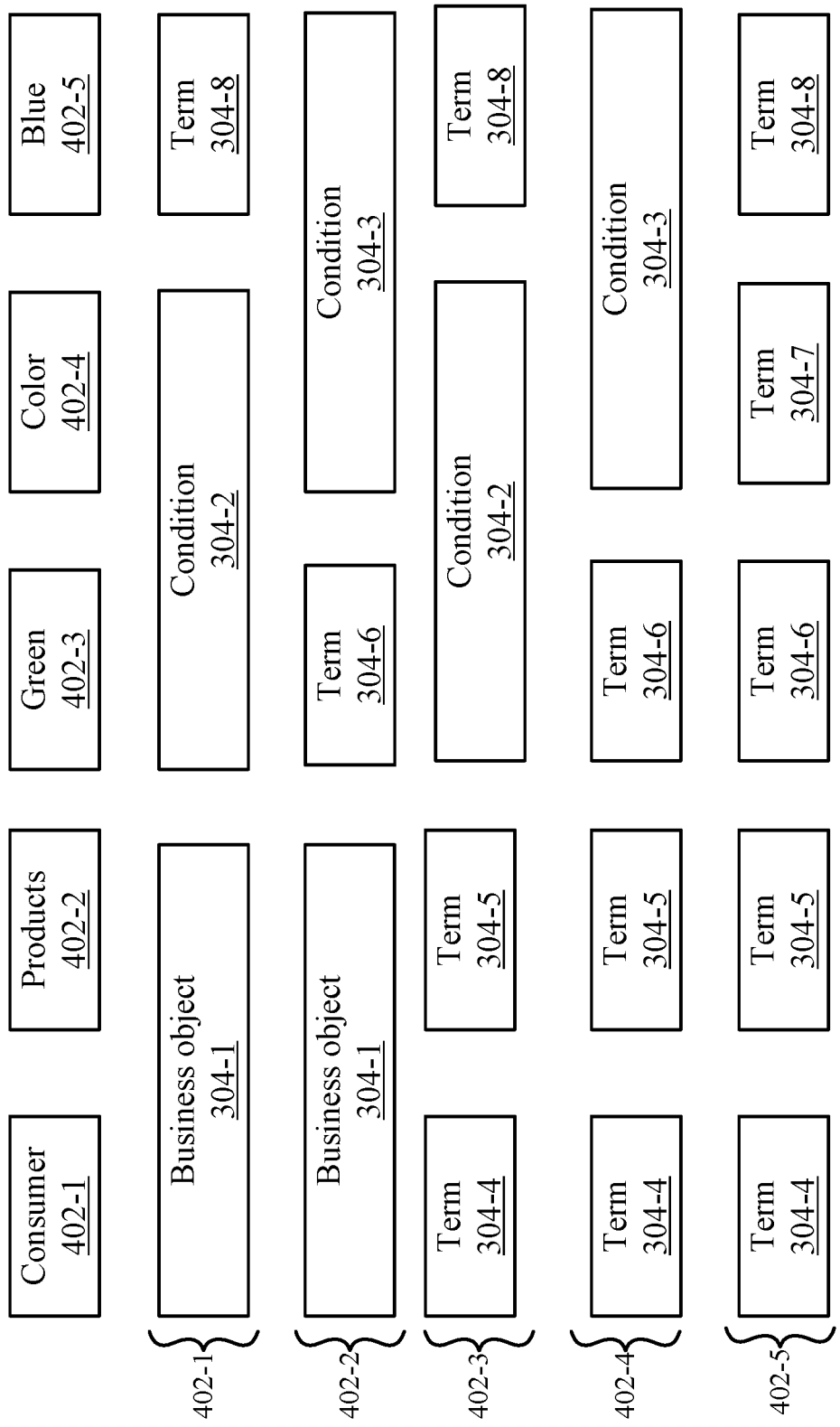
FIG. 4 depicts examples of branch queries according to some embodiments.

Once search query branching process 108 connects the entities, branch queries are formed. FIG. 4 depicts examples of branch queries according to some embodiments. Five branch queries 402-2 to 402-5 are shown. The branch queries may be generated based on the connections among entities. For example, search query branching process 108 may first set a scope of the branch query to a business object entity as shown at 402-1 and 402-2. Then, search query branching process 108 may add an attribute condition, if any, to the branch query. The condition searches within the scope of search. Thereafter, search query branching process 108 may add terms to the branch query. If no business object is found, the business object entity is not used as shown at 402-3, 402-4, and 402-5. After considering the business objects and conditions, each term entity may be added as a natural language-type search as shown at 402-5.

The content of entities for branch queries 402-1 to 402-5 define the search to be performed. For example, branch query 402-2 corresponds to the scope of the business object of "consumer product", and query freestyle: "green" AND COLOR EQ "blue". This branch query searches the business object of consumer product with a query freestyle of the term green and a condition of a color equal to blue. A freestyle query is when the users do not need to know the exact columns in the database where the query takes effect. For example, the address is searched via one input (insertion) field and all the technical features are filled in: street name, postal code, city, country and so on. In this case, the business object of consumer products is searched for the freestyle query of "green" AND COLOR EQ "blue". The other branch queries may be formulated in the same way.

Referring back to FIG. 2, once search query branching process 108 determines the branch queries, at 208, search query branching process 108 ranks the branch queries. For example, search query branching process 108 generates a score for each of the set of branch queries and ranks the branch queries by score.

Figure 5:
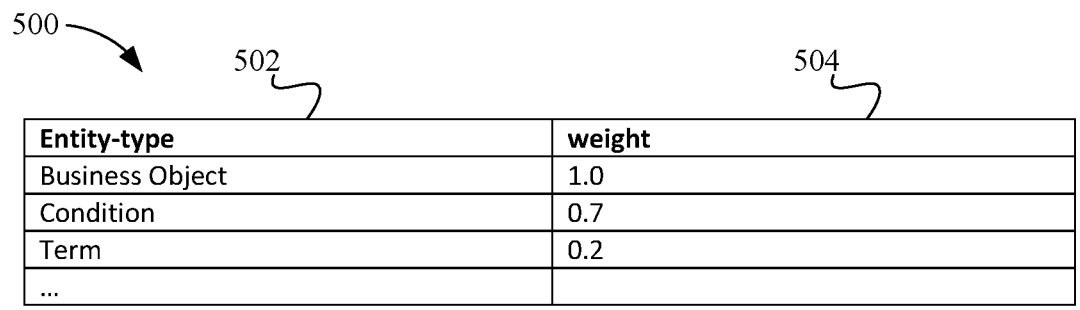
FIG. 5 depicts a table for relevance-weight per type of entity according to some embodiments.

To calculate the scores of the branch queries, search query branching process 108 may define a relevance weight per type of entity. For example, FIG. 5 depicts a table 500 for relevance-weight per type of entity according to some embodiments. A column 502 depicts the entity type and a column 504 depicts the weight for the entity type. As shown, a business object has a weight of 1.0, a condition has a weight of 0.7, and a term has a weight of 0.2. Other entity types may also be assigned different weights. In this example, the entity type of business object is considered the most important and weighted the highest. The next highest is a condition entity type. A term is weighted the least and is considered the least important. These weights may be used because the business object provides a scope of the search based on metadata for structured database 104, which focuses the search to a portion of the data. Also, the condition searches for data that meets the condition while the term search searches for the term without any consideration for metadata. Entities that focus the search may be more important and ranked higher because the search may provide better search results.

In some embodiments, search query branching process 108 calculates a score based on the types of entities associated with the branch query and the associated weights for the types of entities. The content of the entities may not affect the score. However, in some embodiments, the content of the entities may be used, such as a business object that is considered more important is weighted higher. To calculate the score, search query branching process 108 calculates a median of all the entity weights in a branch query. However, other methods may be used, such as the average of the entity weights may be used.

Figure 6:
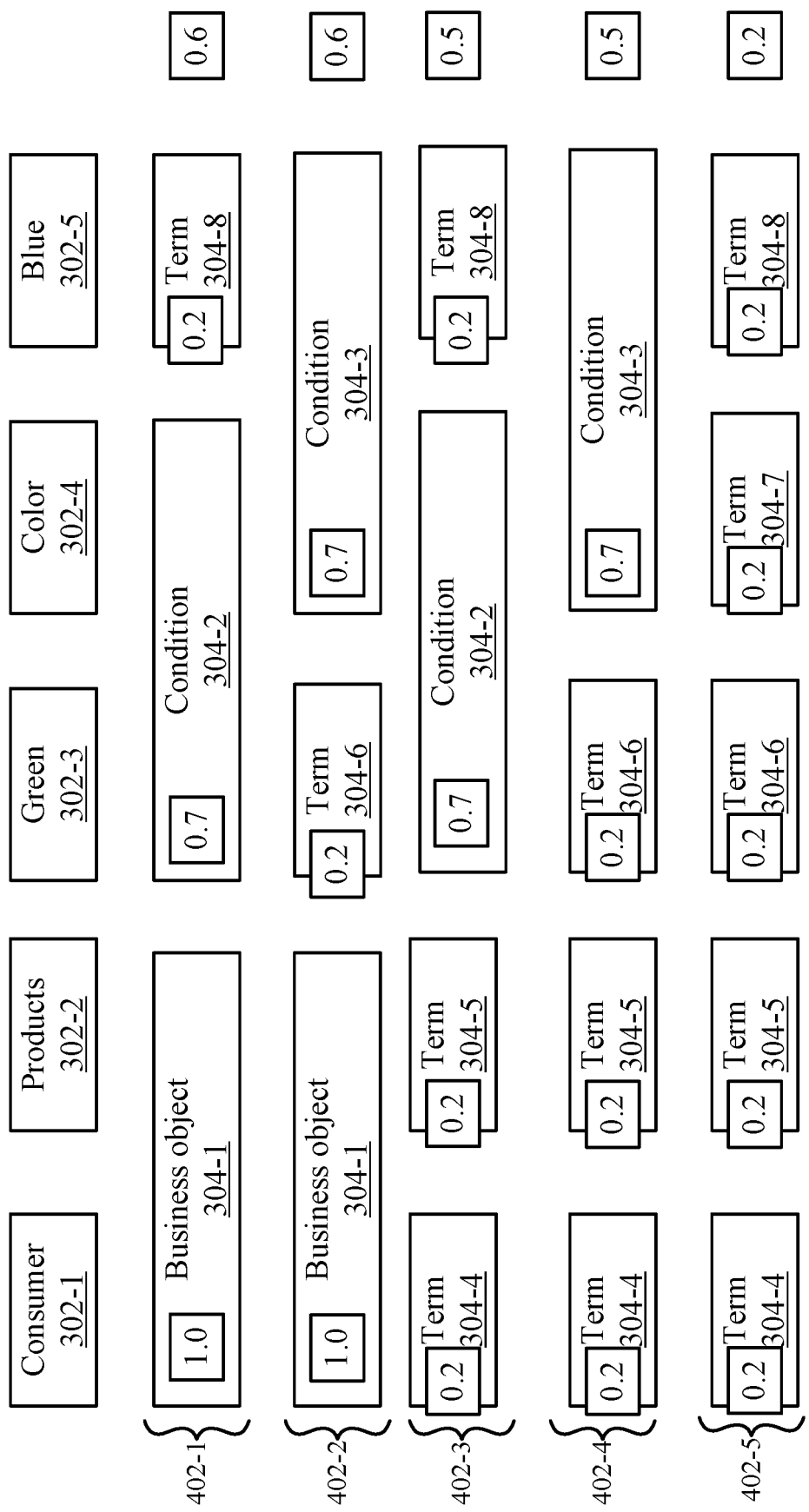
FIG. 6 depicts an example of ranking branch queries according to some embodiments.

FIG. 6 depicts an example of ranking branch queries according to some embodiments. For each entity type, FIG. 6 depicts the corresponding weight. For example, for branch query 402-1, business object 304-1 is assigned the weight of 1.0, condition 304-2 is assigned the weight of 0.7, and term 304-3 is assigned the weight of 0.2. The median score for branch query 402-1 is a score of 0.6. Also, branch query 402-2 includes business object 304-1, term 304-6, and condition 304-3, which is equivalent to a median score of 0.6. Branch queries 402-3 to 402-5 include the median scores of 0.5, 0.5, and 0.2, respectively.

Referring back to FIG. 2, at 210, search query branching process 108 selects a branch query based on the ranking. In this example, branch queries 402-1 and 402-2 include the highest score of 0.6. Search query branching process 108 may perform different actions when a tie results, such as using other factors to break the tie or providing a user with both branch queries to select which one is better, or performing the search with both branch queries. For example, search query branching process 108 may use the length or number of entities to break the tie. Also, search query branching process 108 may also select N queries, such as the top N queries with the highest scores.

Referring back to FIG. 2, at 212, search query branching process 108 uses the branch query to perform a search of structured database 104. Search query branching process 108 replaces the original natural language expression by a branch query that searches based on metadata for structured database 104. For example, a query of a business object consumer product, query freestyle: "green" and color EQ "blue" can be used. Also, search query branching process 108 may inform the user that the branch query was used instead of the natural language query. Additionally, search query branching process 108 can suggest other lower-ranked queries as alternatives or could also perform the original query for comparison of results.

Query Process Example

Figure 7:
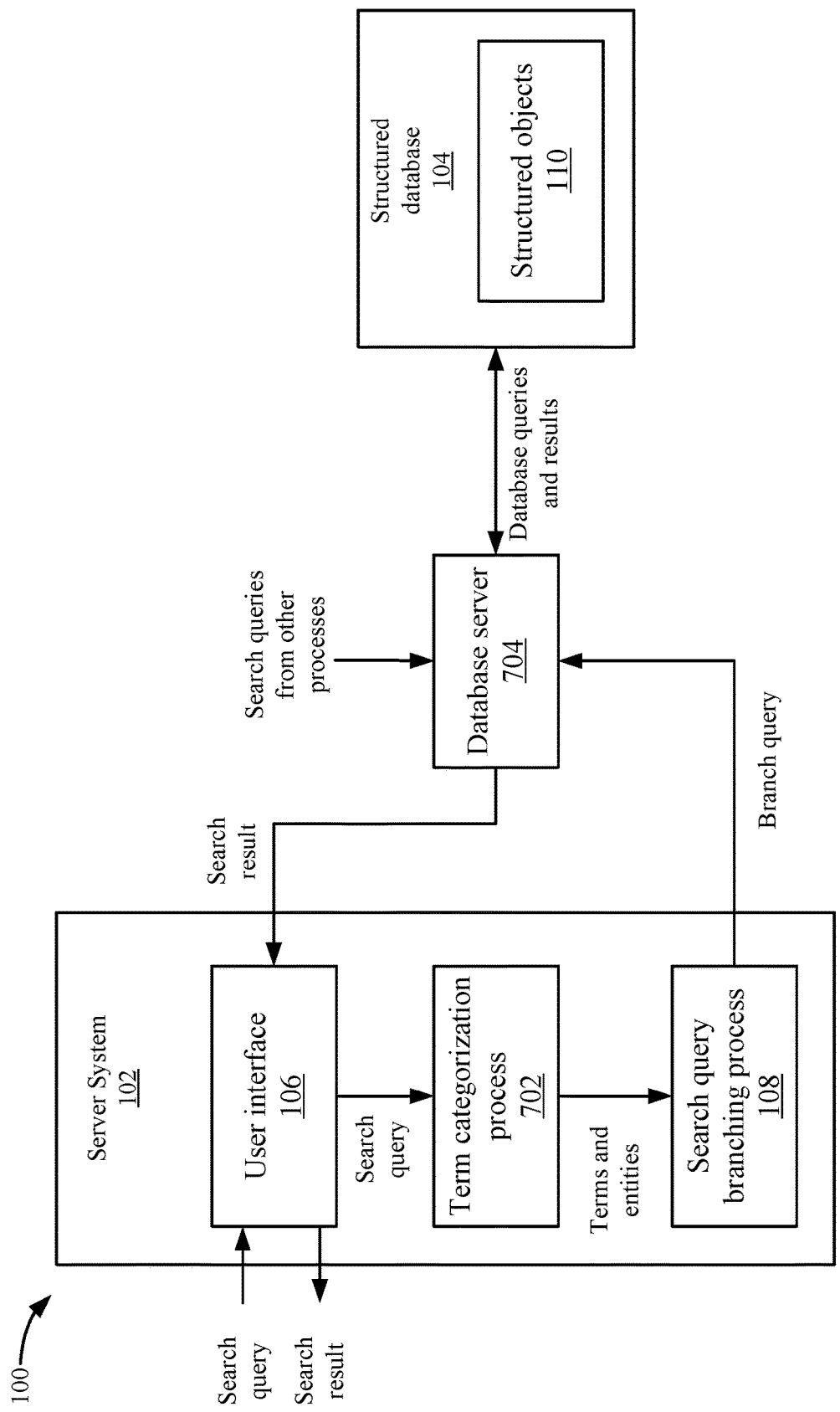
FIG. 7 depicts a more detailed example of the system according to some embodiments.

FIG. 7 depicts a more detailed example of system 100 according to some embodiments. Service system 102 receives a search query in user interface 106. A term categorization process 702 can categorize terms of the search query with different entity types. Then, search query branching process 108 uses the terms and entities to select a branch query as described above. Search query branching process 108 sends the branch query to a database server 704.

Database server 704 may process queries for structured database 104. For example, in addition to processing the branch queries, database server 704 may process search queries from other processes. There may be a limited amount of bandwidth to process queries with structured database 104. For example, when database server 704 searches structured database 104, tables may be locked. Accordingly, it may be important to reduce the number of queries performed by database server 704. Using the ranking process to select one branch query, database server 704 may reduce the number of queries to structured database 104 instead of using all the branch queries. Also, if the branch query includes entities that are associated with metadata for structured database 104, database server 704 can perform the branch query more efficiently in targeted tables or columns compared to a freestyle search using the natural language terms. This reduces the load on structured database 104 as the branch query with entity types can be more efficiently processed and focused on less tables. For example, if a business object can be identified and only the tables associated with the business object searched, the search is more efficient than searching every single business object. The use of the branch query may also increase the speed of processing the query compared to using the natural language text query because less tables may be searched.

Once database server 704 receives the search results, database server 704 can return the search result to user interface 106. User interface 106 can provide the search result to the user.

Pseudo-Code Example

FIG. 8 depicts an example of pseudocode 800 according to some embodiments. Although this example of pseudo-code is described, it will be understood that variations to the process may be appreciated. In a line 1, the process starts with processing a certain term at an offset X having a current branch. The offset is position in the terms of the search query and a current branch may be the current branch being processed.

In a line 2, a variable currentTerm is set to the offset of the analyzed terms, such as the term "green". In line 3, the code sorts the entities by descending weight. This sorts the list of found entities for the term "green" to have the highest weighted entity on top.

Line 4 starts a loop for each entity starting at the offset. In line 5, if the current branch is empty, which only is the case at the initial start, in line 6, the process creates a new branch and in line 7 adds the branch into the branch list.

Usually there is a current branch so the process goes to the Else statement line 8, and in line 9, the process determines if the end of the current branch is less than the offset, which checks that the current branch is not already spanning further than the current position. If the current branch is less than the offset, then line 10 sets a variable branch equal to the variable currentBranch and the variable reserveBranch equal to a clone of the current branch.

In line 12, if currentBranch is spanning further than the current position, then lines 13 and 14 make a copy of reserveBranch, which is similar to the variable currentBranch in lines 10 and 11, but without the last entity. Then, the branch is added to branch list. Now the valid branch has been determined and line 15, the process adds an entity to the branch. Line 16 finds the current end of the branch.

Then, line 17 finds the closest term to the branch end to continue and adds the next term to the current branch. If there is no next term, then the current branch is finished. Line 18 then calls the process term again with the offset of the next term.

In one example, the search query may be "sales orders with delivery date after May". The found entities may be:
BO: "Sales orders"
Condition: ("delivery date">="2018-05")
Term: "Sales"
Term: "orders"
Term: "delivery"
Term: "date"
Term: "after"
Term: "May"

In line 1, the function processTerm may receive the offset of 0 and the current branch may be "sales". The offset may be the numbering of letters in the search query. For example, the term "sales" has 5 letters and the offsets are 1, 2, 3, 4, 5 for the letters s, a, l, e, s. The next term "orders" starts at the offset of 6 and goes from the offsets of 6 to 11. In line 2, the variable currentTerm is equal to "sales" and the entities are sorted in the order of business object of "sales order", and then the term "sales". For the first entity, the current branch is empty and a new branch is started. For branch #1, the entity is the business object of "sales orders" and the business object is added to the branch.

The function processTerm is then recursively called and the next term is "delivery". In line 1, the process receives the offset of 18 and the current branch is branch #1. The offset of 18 is after the word "with", which is ignored. The current term is "delivery" and the entities are the condition of: ("delivery date">="2018-05") and the term of "delivery". Then, search query branching process 108 tests whether the end of branch #1 is less than the offset: 12<18. Then, branch #1 includes the entities of the business object of "sales orders" and the condition of ("delivery date">="2018-05"). The condition spans terms until the term "May", and there is no next term after "May". Thus, branch #1 is finished.

A new branch is created for the term "sales". The end of branch #1 is greater than the offset of 0 and search query branching process 108 uses reserveBranch, which is empty at this point and is referred to as branch #2. Search query branching process 108 adds term "sales" to branch #2. The next term is "orders".

The function processTerm is called again with the offset of 6 and the variable currentBranch is branch #2. The variable currentTerm is "orders" and the currentTerm entities are the business object of "sales orders" and the term "orders". The business object does not start at offset 6 and thus is skipped.

For the term "orders" the end of branch #2 is equal to 5 (the number of letters in sales is 5), which is less than 6. The term orders" is then added to branch #2. The next term is "delivery".

The function processTerm is then called again with the offset of 18 and the current branch of branch #2. The current term is "delivery" and the current term entity starting at the offset is a condition ("delivery date">="2018-05") and a term "delivery". For the condition, the end of branch #2 is equal to 12, which is less than 18. The condition is then added to branch #2 and branch #2 includes the term "sales", the term "orders", and the condition ("delivery date">="2018-05"). There is no next term after the term "May" in the condition and branch #2 is finished. The process then continues for the terms "delivery", "date", "after", and "May". The process then continues to generate branch queries as a person skilled in the art could appreciate.

Further Examples

FIG. 9 depicts a table 900 showing entities for a search query of "sales orders with delivery date after May" according to some embodiments. Each term is listed at 902 and the entities for the terms are shown at 904. Search query branching process 108 may then determine the branches as:
  {0.85} Business Object(Sales orders)[1.0]→Condition (delivery date after May) [0.7]
  {0.37} Term(Sales) [0.2]→Term(orders) [0.2]→Condition(delivery date after May) [0.7
  {0.36} Business Object(Sales orders))[1.0]→Term(delivery)[0.2]→Term(date) [0.2]→Term(after) [0.2]→Term (May) [0.2]
  {0.82} Term(Sales) [0.2]→Term(orders) [0.2]→Term(delivery) [0.2]→Term(date) [0.2]→Term(after) [0.2]→Term(May) [0.2]

In the above, the score is within the squiggly brackets "{ }", the type of entity is listed (e.g., Business Object) with the content of the entity (e.g., "Sales orders") and the weight assigned is within square brackets "[ ]". The entities are connected via arrows "→". In some embodiments, search query branching process 108 may remove branches with only terms as long as there are better alternatives, such as a branch query that has a business object in it. For example, search query branching process 108 removes a branch query with only terms, such as branch query #4 above, when other queries with business objects and conditions exist because those queries are considered higher ranked. Search query branching process 108 can also remove a branch query if there is a local alternative for the two terms. For example, search query branching process 108 removes branch query #2 because the condition in query #2 is used in query #1, but in combination with a business object, which is higher ranked than the terms of "sales" and "orders" in query #2. That is, search query branching process 108 removes branch query #2 because the business object of "sales orders" includes the terms of "sales" and "orders".

According to the scores, search query branching process 108 selects branch query #1, which has a high score of 0.85.

This produces a search of the business object of "sales orders" where "delivery date">=2018-05.

FIG. 10 depicts a second example according to some embodiments. The search query of "fiscal year 2014" is shown as terms at 1002 with the entities for the terms are shown at 1004. The entities include a condition entity and term entities.

In this example, a business object entity does not match one or more of the terms, but "fiscal year" is an attribute in multiple business objects of "business partners" and "customers". Accordingly, there could be two condition objects.

Search query branching process 108 may then determine the branches as:
  1: Condition(Fiscal year 2014)/Business object "Business Partners" [0.7]
  2. Condition(Fiscal year 2014)/Business object "Customers" [0.7]
  3. Term(Fiscal) [0.2]→Term(year)→Term(2014) [0.2].

Search query branching process 108 removes query #3 because term-only alternatives are removed if other alternative branch queries exist. Then, search query branching process 108 determines the scores for the branches as follows:
  {0.7} Condition(Fiscal year 2014)/Business object "Business Partners"
  {0.7} Condition(Fiscal year 2014)/Business object "Customers"

Because both branches have equal scores, search query branching process 108 may let the user select which query to use or use additional factors to select one of the queries, or perform both queries.

FIG. 11 depicts a third example according to some embodiments. A search query of "business partner Company Name #1" is being processed and the terms are shown at 1102. Entity types for the terms are shown at 1104 and include a business object and terms.

Search query branching process 108 determines the branch queries as:
  {0.6}Business Object(Business Partner) [1.0]→Term (Company Name #1) [0.2]
  {0.2} Term(Business) [0.2]→Term(Partner) [0.2]→Term (Company Name #1) [0.2]

Search query branching process 108 removes branch query #2 because it contains only terms and other alternative branch queries exist. Search query branching process 108 determines the query to be executed as branch query #1 with a media of {0.6}. The branch query performs a search on the business object "business partners" for the company "Company Name #1" in all search fields of the business object "business partners".

CONCLUSION

Accordingly, some embodiments allow a user to use a natural language expression for a search. The natural language search of a structured database may result in very few or zero results from structured database 104. Search query branching process 108 generates a branch query that uses the metadata of structured database 104 to generate a technical query of terms that relate to the metadata. Search query branching process 108 then selects the highest-ranked branch query to perform the search of structured database 104. Transforming the natural language expression into a branch query provides better results in a search of structured database of 104. Also, selecting one of the branch queries that are ranked the highest may provide better search results in addition to lowering the load on structured database 104.

System

Figure 12:
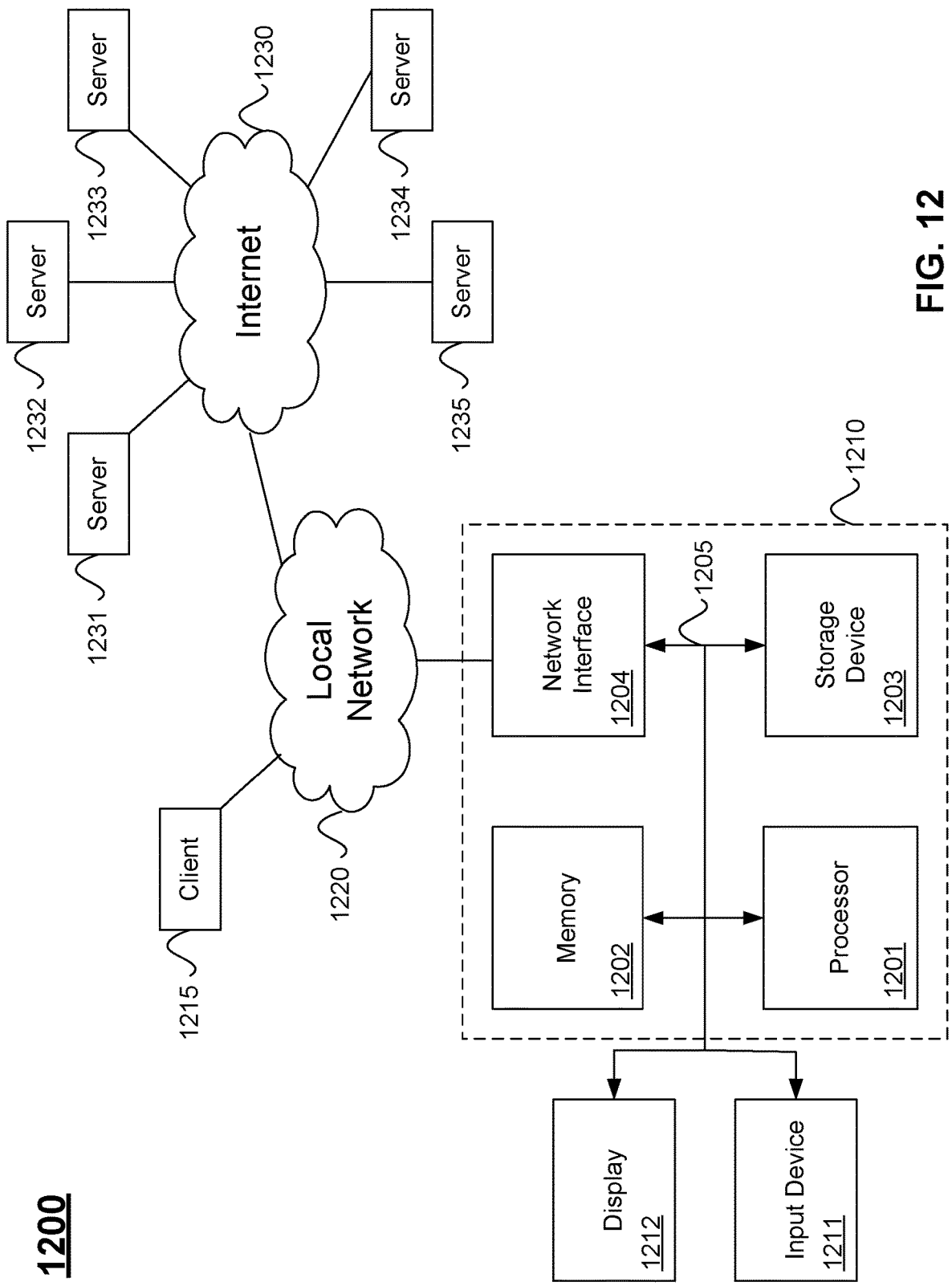
FIG. 12 illustrates hardware of a special purpose computing machine configured with a search query branching process according to one embodiment.

FIG. 12 illustrates hardware of a special purpose computing machine configured with search query branching process 108 according to one embodiment. An example computer system 1210 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable storage mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information through the network interface 1204 across a local network 1220, an Intranet, or the Internet 1230. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a search query including a plurality of terms formed in a natural language expression, wherein terms in the plurality of terms are included in one or more entities that are categorized in a plurality of types of entities;
   analyzing, by the computing device, the one or more entities for the plurality of terms to generate a plurality of branch queries, two or more branch queries being generated when a term in the plurality of terms is associated with two or more entities, the two or more branch queries include different entities in the two or more entities, each branch query associates a combination of entities to the plurality of terms, the combination of entities being different than combinations of entities of other branch queries;
   calculating, by the computing device, scores for each of the plurality of branch queries based on weights associated with types of entities comprising each of the branch queries and ranking the plurality of branch queries based on the scores, the types of entities including a condition type of entity for one or more terms in the plurality of terms that form a condition statement including an attribute, an operator, and a value, the weights associated with the types of entities comprising a condition weight for a condition type of entity;
   selecting, by the computing device, a branch query of the plurality of branch queries based on the ranking for the branch query; and
   using, by the computing device, the entities of the branch query to perform a search of a structured database of structured objects.

2. The method of claim 1, wherein analyzing the one or more entities for the plurality of terms to generate the plurality of branch queries comprises:
   generating a term sequence for the plurality of terms;
   ordering the one or more entities based on the term sequence and a term in which the one or more entities are associated; and
   generating the plurality of branch queries based on the ordering of the one or more entities.

3. The method of claim 2, wherein generating the plurality of branch queries based on the ordering of the one or more entities comprises:
adding adjacent entities in the ordering to form a branch query.

4. The method of claim 3, wherein adding adjacent entities comprises:
when the ordering includes two or more entities in a same position in the ordering, generating two or more branch queries where each branch query in the two or more branch queries includes a different entity in the two or more entities in the same position.

5. The method of claim 1, wherein the plurality of types of entities comprises:
a business object type of entity for one or more terms in the plurality of terms that form a business object.

6. The method of claim 5, wherein the plurality of types of entities comprises:
a term type of entity for a term in the plurality of terms.

7. The method of claim 5, wherein the business object type of entity or the condition type of entity span two or more terms in the plurality of terms.

8. The method of claim 1, wherein ranking the plurality of branch queries based on the types of entities comprises:
generating a score based on the types of entities in each of the plurality of branch queries.

9. The method of claim 8, wherein selecting the branch query of the plurality of branch queries based on the ranking for the branch comprises:
selecting the branch query with a highest ranked score.

10. The method of claim 8, wherein:
different types of entities are assigned different weights that are used to generate the score for each of the plurality of branch queries.

11. The method of claim 10, wherein:
a business object type of entity is assigned a first weight; and
a conditional type of entity is assigned a second weight, wherein the first weight is higher than the second weight.

12. The method of claim 1, wherein using the entities of the branch query to perform the search of the structured database of structured objects comprises:
using content of one of the entities and the type of one of the entities to determine a scope of search that defines a portion of data to search in the structured database of structured objects.

13. The method of claim 1, wherein using the entities of the branch query to perform the search of the structured database of structured objects comprises:
using content of one of the entities of the branch query and the type of the one of the entities to determine a condition to apply in the search of the structured database of structured objects.

14. The method of claim 1, wherein using the entities of the branch query to perform the search of the structured database of structured objects comprises:
determining a scope of the search based on a business object type entity in the one or more entities; and
determining a condition to apply in the business object based on a condition type entity in the one or more entities.

15. A non-transitory computer-readable storage medium containing instructions, that when executed, control a computer system to be configured for:
receiving a search query including a plurality of terms formed in a natural language expression, wherein terms in the plurality of terms are included in one or more entities that are categorized in a plurality of types of entities;
analyzing the one or more entities for the plurality of terms to generate a plurality of branch queries, each branch query associates a combination of entities to the plurality of terms, two or more branch queries being generated when a term in the plurality of terms is associated with two or more entities, the two or more branch queries include different entities in the two or more entities, the combination of entities being different than combinations of entities of other branch queries;
calculating, by the computing device, scores for each of the plurality of branch queries based on weights associated with types of entities comprising each of the branch queries and ranking the plurality of branch queries based on the scores, the types of entities including a condition type of entity for one or more terms in the plurality of terms that form a condition statement including an attribute, an operator, and a value, the weights associated with the types of entities comprising a condition weight for a condition type of entity;
selecting a branch query of the plurality of branch queries based on the ranking for the branch query; and
using the entities of the branch query to perform a search of a structured database of structured objects.

16. The non-transitory computer-readable storage medium of claim 15, wherein analyzing the one or more entities for the plurality of terms to generate the plurality of branch queries comprises:
generating a term sequence for the plurality of terms;
ordering the one or more entities based on the term sequence and a term in which the one or more entities are associated; and
generating the plurality of branch queries based on the ordering of the one or more entities.

17. The non-transitory computer-readable storage medium of claim 15, wherein using the entities of the branch query to perform the search of the structured database of structured objects comprises:
using content of one of the entities of the branch query and the type of the one of the entities to determine a condition to apply in the search of the structured database of structured objects.

18. An apparatus comprising:
one or more computer processors; and
a non-transitory computer-readable storage medium comprising instructions, that when executed, control the one or more computer processors to be configured for:
receiving a search query including a plurality of terms formed in a natural language expression, wherein terms in the plurality of terms are included in one or more entities that are categorized in a plurality of types of entities;
analyzing the one or more entities for the plurality of terms to generate a plurality of branch queries, each branch query associates a combination of entities to the plurality of terms, two or more branch queries being generated when a term in the plurality of terms is associated with two or more entities, the two or more branch queries include different entities in the two or more entities, the combination of entities being different than combinations of entities of other branch queries;
calculating, by the computing device, scores for each of the plurality of branch queries based on weights associated with types of entities comprising each of the branch queries and ranking the plurality of branch queries based on the scores, the types of entities including a condition type of entity for one or more terms in the plurality of terms that form a condition statement including an attribute, an operator, and a value, the weights associated with the types of entities comprising a condition weight for a condition type of entity;

selecting a branch query of the plurality of branch queries based on the ranking for the branch query; and using the entities of the branch query to perform a search of a structured database of structured objects.

\* \* \* \* \*